United States Patent
Sudhakar et al.

(10) Patent No.: US 7,694,165 B2
(45) Date of Patent: Apr. 6, 2010

(54) AUTOMATION OF BARE METAL RECOVERIES

(75) Inventors: Narayanamurthy Sudhakar, Hyderabad (IN); Jegan Devaraju, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 11/744,066

(22) Filed: May 3, 2007

(65) Prior Publication Data

US 2008/0276123 A1 Nov. 6, 2008

(51) Int. Cl.
G06F 11/00 (2006.01)
(52) U.S. Cl. .............................. 714/3; 714/2
(58) Field of Classification Search ................ 714/2, 714/3, 5–6, 8–9, 11–13, 36; 711/162; 713/1
See application file for complete search history.

(56) References Cited

U.S. PATENT DOCUMENTS

| 5,469,573 | A | 11/1995 | McGill, III et al. |
| 6,317,845 | B1 | 11/2001 | Meyer et al. |
| 6,625,754 | B1 | 9/2003 | Aguilar et al. |
| 6,845,464 | B2 | 1/2005 | Gold |
| 7,216,251 | B2 * | 5/2007 | Gaunt et al. .................... 714/6 |
| 7,447,888 | B2 * | 11/2008 | Du et al. ......................... 713/1 |
| 7,467,324 | B1 * | 12/2008 | Davda et al. .................... 714/6 |
| 7,467,328 | B2 * | 12/2008 | Roth et al. ..................... 714/15 |
| 7,475,282 | B2 * | 1/2009 | Tormasov et al. .............. 714/6 |
| 7,555,679 | B2 * | 6/2009 | Cheston et al. ............... 714/38 |
| 2003/0221095 | A1 * | 11/2003 | Gaunt et al. .................... 713/1 |
| 2004/0255106 | A1 | 12/2004 | Rothman et al. |
| 2006/0069902 | A1 | 3/2006 | Rui et al. |
| 2006/0150037 | A1 * | 7/2006 | Wang ........................ 714/100 |
| 2006/0161811 | A1 | 7/2006 | Welts |
| 2007/0011493 | A1 | 1/2007 | Du et al. |
| 2007/0143591 | A1 * | 6/2007 | Dellacona ....................... 713/2 |

OTHER PUBLICATIONS

Matt et al., "Bootable Restoration CDs with Mondo," printed from http://www.usenix.net/events/lisa01/tech/full_papers/amatangelo/amatangelo.ps, printed on Feb. 26, 2007, 8 pages, USENIX, USA.
Bonkenburg et al., "LifeBoat—An Autonomic Backup and Restore Solution," Lisa XVIII, Nov. 2004, pp. 159-169, USENIX, USA.
Amatangelo, et al., "Solaris Bare-Metal Recovery from a Specialized CD-ROM and Your Enterprise Backup Solution," Lisa XV, Dec. 2001, pp. 157-162, USENIX, USA.
Unknown, "BOOTMGR—multi-Boot ManaGeR", 2006, 5 pages, BTTR Software, USA.

* cited by examiner

*Primary Examiner*—Dieu-Minh Le
(74) *Attorney, Agent, or Firm*—Senniger Powers LLP

(57) ABSTRACT

Completely recovering data stored on a hard disk or other computer-readable media of a computing system from scratch in an automated manner. Recovery information and post-restore customization data are stored on the backup medium that stores the backup of the computer-readable media of the computing system (e.g., operating system, application programs, user data, application data, etc.). The computing system is rebooted into a recovery environment where a recovery script automates the recovery of the backup. The recovery information and post-restore customization data are applied to the offline, recovered backup to ensure continuity. The computing system is rebooted into the recovered backup.

16 Claims, 4 Drawing Sheets

AUTOMATION OF BARE METAL RECOVERIES

BACKGROUND

Users regularly take backups of a computer using a backup application. The backups are stored on a backup storage medium. When the computer malfunctions (e.g., due to operating system errors), the user may need to perform a Bare metal recovery. Bare metal recovery is a term of art that generally refers to the process of recovering the contents of a hard disk from scratch (e.g., the bare metal). To perform this type of recovery, the computing device is booted into a recovery environment via a recovery boot medium. The recovery boot medium may be a compact disc, digital versatile disc, floppy disk, partition on a hard disk, or other medium from which the computing device can boot. During a bare metal recovery, all data in the computer is recovered from a previous backup including the operating system, application programs, user state, and other data. For example, the recovery may involve repartitioning the disks, restoring data, setting the boot configuration, injecting hardware drivers, and finally booting into the restored operating system.

In existing bare metal recovery methods, the user becomes an important element in ensuring that a recovery completes successfully. For example, the user may manually change the boot device order to boot the computer into the recovery environment or boot into the restored operating system after recovery. Further, on computers with a master boot record (MBR), there is not a standard way to access and change the boot order of devices such as through an application programming interface or user interface. The user has to go through the basic input/output system (BIOS) to make changes to the boot order. Due to this need for user involvement, existing systems do not allow automated and efficient development and testing of backup applications, storage media, and technologies that provide bare metal recovery solutions. Existing system also prevent administrators from restoring physically remote machines (e.g., present in a different datacenter of the company).

Moreover, during the bare metal recovery, it is difficult to persist recovery information, the automation process state, and other information from the original operating system to the recovery environment in an automated manner. Maintaining recovery information, post restore customization data, and other state information on existing disks in the computer is not reliable because those disks may be erased and repartitioned during bare metal recovery. Further, if such state information is stored on a network share and the network becomes inaccessible during the recovery (e.g., enabling the network may compromise the recovery environment), the recovery will fail.

Automated execution of recovery in the recovery environment also poses challenges. For example, some existing methods rely on a recovery executing or triggered by a remote computer. If the network is not available, this scheme does not work. Moreover, enabling network access in a minimal recovery environment might expose the environment to malicious attacks (e.g., a virus).

SUMMARY

Embodiments of the invention include automate a bare metal recovery of a computing system. In an embodiment, the invention receives a request for recovery of an operating system version on a target computing device. Responsive to the request, the target computing device stores recovery information and post-restore customization data on a backup computer storage medium. The target computing device is booted into a recovery environment and a recovery script triggers recovery of the requested operating system version using the recovery information. Any post-recovery customization is applied to the recovered operating system version to, for example, clear out any transient information. The target computing device is rebooted into the recovered operating system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
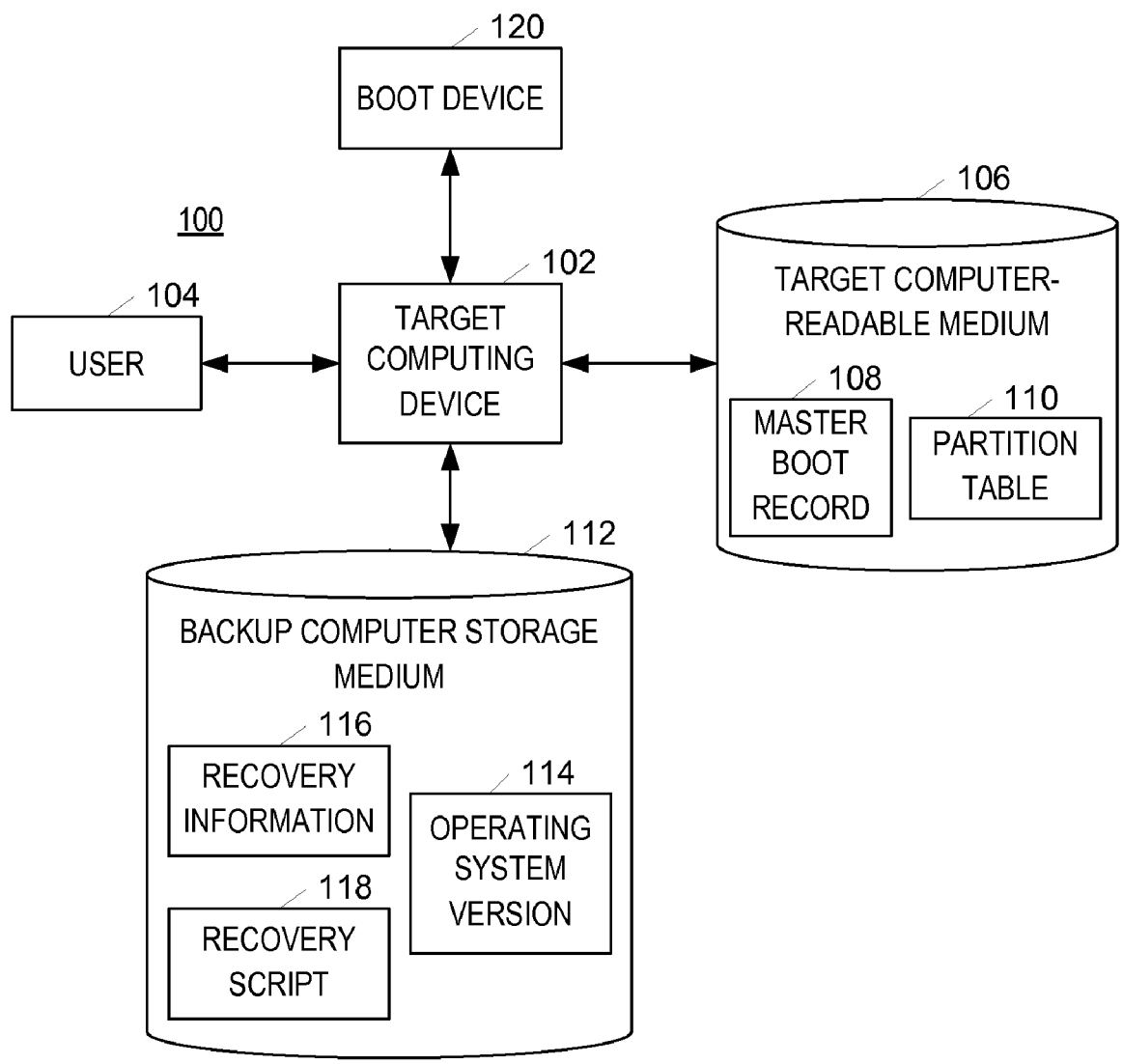
FIG. 1 is an exemplary block diagram illustrating an exemplary operating environment for restoring an operating system version from a backup medium.

In an embodiment, the invention completely recovers a computing device such as a target computing device 102 in FIG. 1 in a self-automated fashion. In embodiments of the invention, the recovery is automated locally to the computing device without user intervention or aid. There is no need for a remote computer to control the recovery, as in existing systems. Aspects of the invention implement a bare metal recovery to restore all data associated with the target computing device 102 including, but not limited to, an operating system, application programs, and other data such as application or user data. The recovery information, post restore customization data, and other information is maintained in a backup storage medium that contains the backup. In an embodiment, the backup storage medium is always accessible during the recovery and is never erased. Hence this information is safe and always available. Further, a recovery script is triggered through a boot script of the recovery environment thus avoiding any external connectivity.

A user 104 takes a backup of the target computing device 102 using a backup application. The backup is stored on a backup computer storage medium 112 such as an external or internal disk or other medium. In the exemplary operating environment 100 of FIG. 1, the user 104 interfaces with the target computing device 102 to request recovery of a target computer-readable medium 106. The target computing device 102 includes or has access to at least one target computer-readable medium 106. The target computer-readable medium 106 comprises any storage available to the target computing device 102. For example, the target computer-readable medium 106 includes a hard disk, partitions on a hard disk, random access memory (RAM) in firmware, or a flash drive. The target computer-readable medium 106 in the example of FIG. 1 has a master boot record (MBR) 108 and a partition table 110. The MBR 108 is known in the art. The MBR 108 has been described, for example, as the first sector of the first computer-readable medium of the target computing device 102. This memory area is read upon startup of the target computing device 102. The MBR 108 includes instructions that locate the system (e.g., startup) partition of the hard disk, and then read and execute the instructions located in the first sector of the system partition. The system partition is also known in the art.

While embodiments of the invention are described with reference to MBR systems, embodiments of the invention are operable with other platforms and means of interfacing an operating system with computing hardware. For example, embodiments of the invention are operable with computing systems using the extensible firmware interface (EFI).

The target computing device 102 further includes or has access to the backup computer storage medium 112. The backup computer storage medium 112 stores, for example, an operating system version 114, recovery information 116, and at least one recovery script 118. In another embodiment (not shown), the recovery script 118 is stored on a medium other than the backup computer storage medium 112 (e.g., on a flash drive, or a network share). The operating system version 114 corresponds to a full backup of the contents of the target computer-readable medium 106 at a particular time including the operating system, application programs, user data, application data, etc. The target computing device 102 also has access to a boot device 120 (e.g., external) such as a compact disc drive, a digital versatile disc drive, a flash drive, a network server, and the like. The boot device 120 enables the target computing device 102 to boot into a recovery environment since the target computer-readable medium 106 will be erased during recovery. The boot into the recovery environment occurs, for example, via a recovery boot medium storing a bootable operating system (e.g., a reduced or minimal operating system).

Figure 2:
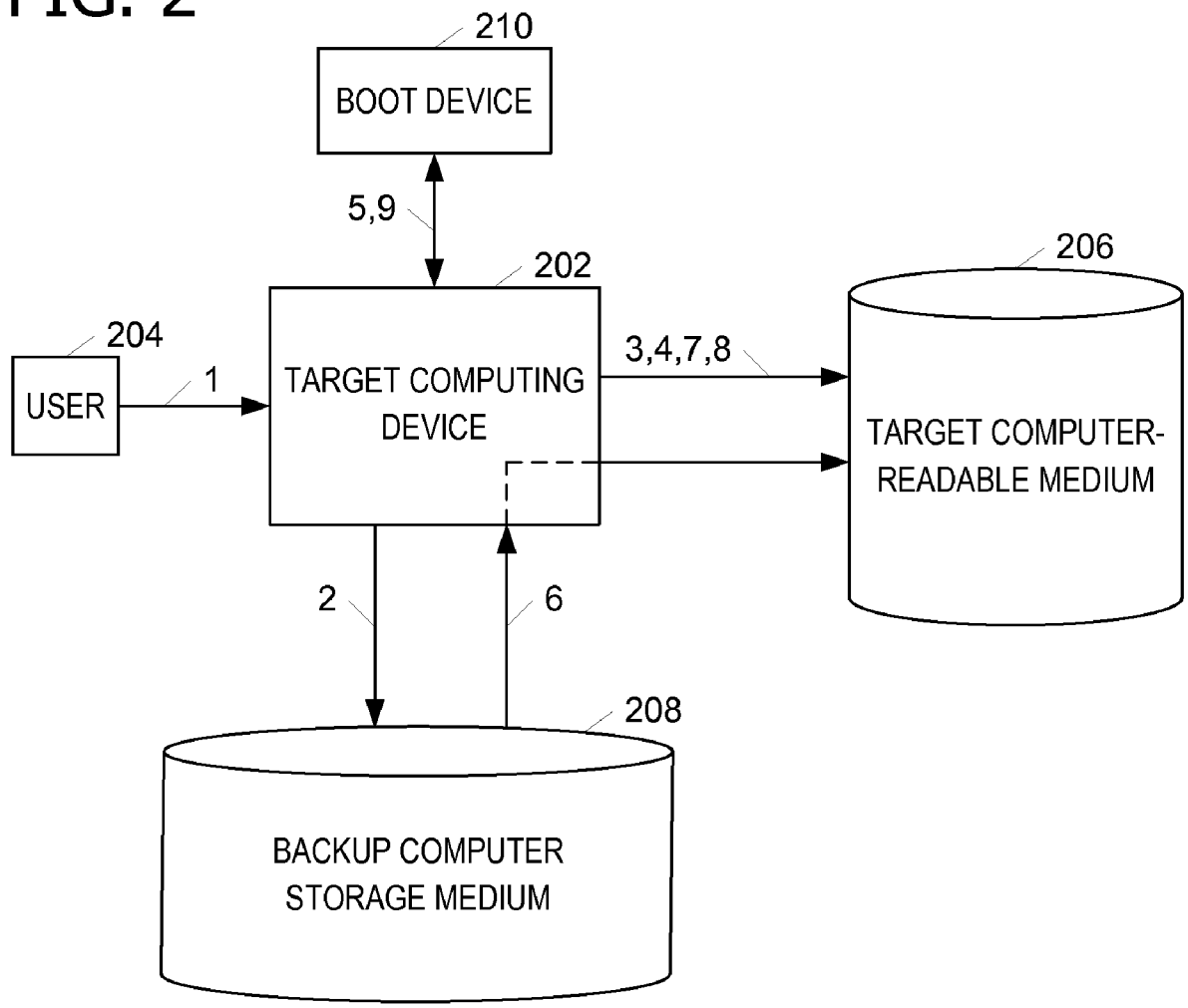
FIG. 2 is an exemplary block diagram illustrating the interaction between the elements of the exemplary operating environment of FIG. 1.

Referring next to FIG. 2, an exemplary block diagram illustrates the interaction between the elements of the exemplary operating environment 100 of FIG. 1. At 1, a target computing device 202 receives a request for a bare metal recovery of a backup of an operating system stored on a backup computer storage medium 208. The request may come from a user 204, or be triggered automatically by an event. At some time before receiving the request, one or more full backups of a target computer-readable medium 206 were performed and stored on the backup computer storage medium 208. The backups include associated application programs, user data, application data, configuration settings, etc. The backup computer storage medium 208 stores the plurality of backups with each corresponding to a different state of the target computing device 202 or to a different time. At 2, the target computing device 202 stores, responsive to the received request, recovery information associated with the received request on the backup computer storage medium 208. The recovery information includes, for example, identification of the requested backup (e.g., an identifier corresponding to the requested backup) and any other options for the restore operation (e.g., whether disks should be partitioned or not). The target computing device 202 may also store post-restore customization data, automation state information, or the like on the backup computer storage medium 208, as this medium is the only medium that will not be modified during the bare metal recovery. Any other medium will be erased, reformatted, repartitioned, or otherwise overwritten with data. Persisting the automation process state on the backup computer storage medium 208 ensures the safety and availability of the state information during the recovery. Embodiments of the invention also configure the recovery environment to execute a recovery script automatically upon boot. For example, a boot script stored on the recovery boot medium is modified to trigger execution of the recovery script upon reboot.

At 3, the target computing device 202 accesses a partition table in an MBR associated with the target computer-readable medium 206. The partition table describes a plurality of partitions including a system partition associated with the target computer-readable medium 206. The partition table has a boot flag associated with each of the plurality of partitions. Each boot flag has a value indicating whether the associated partition is active or inactive. Boot code in the basic input/output system (BIOS) of MBR-based computing devices boots into a partition that is marked 'active' in the partition table in the MBR of the target computer-readable medium 206. If no partition is marked active, then the boot code proceeds to the next available boot device 210. Thus, by marking a partition active or inactive, the boot order may be switched between the target computer-readable medium 206 and the device next to it in the boot sequence. Alternatively, if the backup computer storage medium 208 is actually another partition on the target computer-readable medium 206, this partition may be marked 'active' so that the boot code boots the target computing device 202 into this partition for the recovery.

At 4, the target computing device 202 sets the value of the boot flag of the system partition to indicate that the system partition is inactive. The procedure for setting the value of the boot flags in the partition table is known in the art. With the boot flag of the system partition set to inactive, the target computing device 202 looks to the next device in the device boot order upon the next reboot. In an example, the next device is a compact disc drive or other device capable of booting the target computing device 202 into the recovery environment.

The recovery environment includes, for example, another operating system such as a reduced operating system or a special-purpose operating system. In such an operating system, only the basic functions of the target computing device 202 are supported (e.g., no extra hardware drivers, no network connectivity, etc.).

Upon rebooting into the recovery environment at 5, a recovery script or other software for automating the recovery automatically executes. For example, boot up or boot time scripts associated with the target computing device 202 (e.g., stored on the backup computer storage medium 208) may be edited or otherwise modified to identify and execute the recovery script or invoke automation binaries to trigger the recovery. Accessing the recovery script from within the boot up scripts ensures that the recovery will occur. If the recovery script was stored on a system that became unavailable during the recovery, the recovery would fail.

During execution of the recovery script, the target computer-readable medium 206 is prepared to receive the requested backup of the operating system version. For example, the target computer-readable medium 206 is completely erased, reformatted, repartitioned, or the like. The requested backup of the operating system is restored, recovered, or otherwise retrieved from the backup computer storage medium 208 at 6. The requested backup of the operating system (including application programs and other software) is then applied to the target computer-readable medium 206.

Before and/or during the recovery, the recovery information stored on the backup computer storage medium 208 is accessed. For example, the recovery information may include data describing the requested backup of the operating system. In this manner, the recovery script is able to identify and restore the requested backup. In addition, other data from the accessed recovery information may be obtained and applied to the restored backup of the operating system at 7. For example, user settings (e.g., in a registry), preferences, profiles, and the like are applied to the restored backup of the operating system. Additionally, continuity data may be stored on the recovered backup of the operating system. For example, a log file or other repository of post-restore customization data on the target computer-readable medium 206 may be updated to reflect a date and time of the operating system recovery, and to identify the particular operating system recovered. Additional settings may be configured (e.g., in a registry), patches may be applied, or other post-recovery clean up may occur. For example, applying the post-restore customization data may clear out any transient information from the restored operating system to ensure continuity of automation. This offline modification of the restored operating system ensures automation continuity. Without such modification after restoration, the state of the automation process reverts to the time of the backup of the operating system version.

When recovery is complete, the recovery script operates to reset the value of the boot flag of the system partition to indicate that the system partition is active at 8. The target computing device 202 is then rebooted into the recovered operating system at 9. Since the target computer-readable medium 206 precedes the boot device 210 in the device boot order, the target computing device 202 boots from the target computer-readable medium 206 storing the newly recovered operating system (and application programs, user data, etc.).

The operations illustrated in FIG. 2, with the exception of the user 204 sending the recovery request to the target computing device 202 in an embodiment, may execute or be performed without user intervention. As such, the recovery solution illustrated in FIG. 2 is completely automated.

Figure 3:
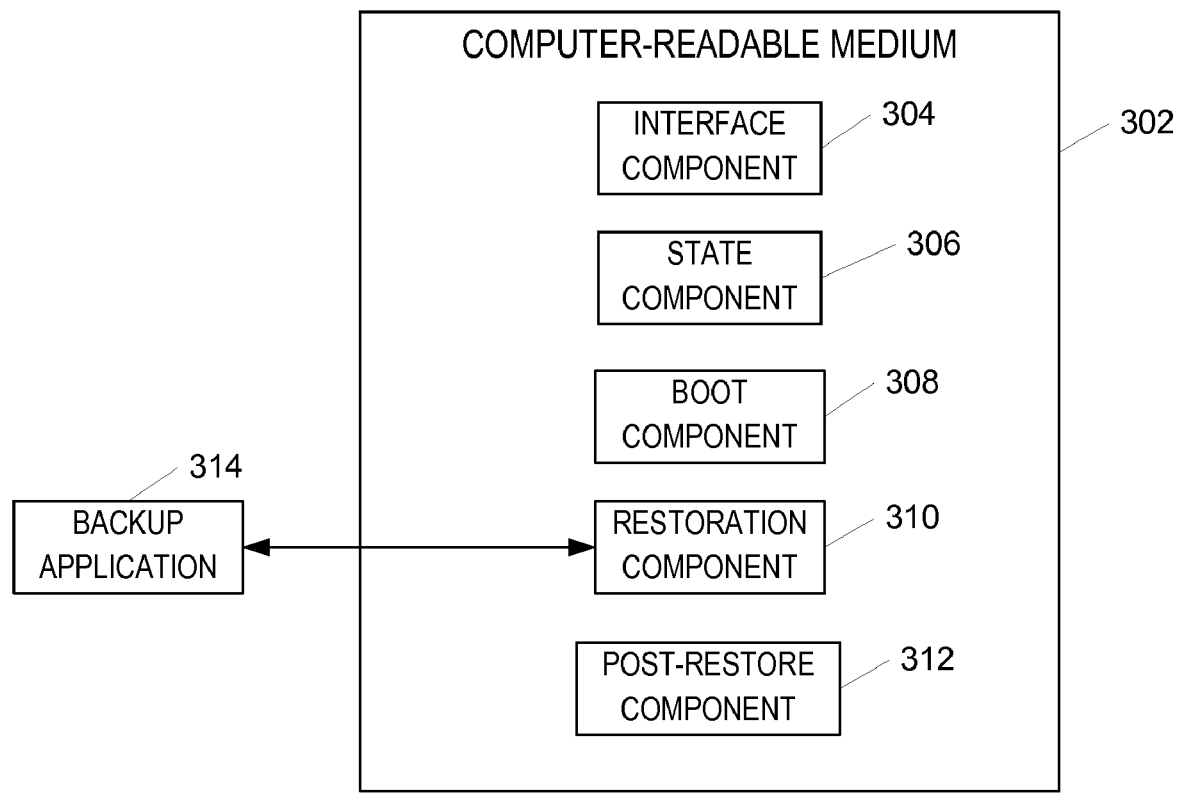
FIG. 3 is a block diagram illustrating an exemplary computer-readable medium on which aspects of the invention may be stored.

Referring next to FIG. 3, a block diagram illustrates an exemplary computer-readable medium on which aspects of the invention may be stored. In an embodiment, one or more computer-readable media such as computer-readable medium 302 have computer-executable components for implementing aspects of the invention. The components include an interface component 304, a state component 306, a boot component 308, a restoration component 310, and a post-restore component 312. The interface component 304 receives a request for recovery of a backup of software installed on a target computing device. The backup of the installed software is stored on a backup computer storage medium. The state component 306, responsive to the request received by the interface component 304, stores recovery information on the backup computer storage medium. The recovery information is associated with the request and with post-restore customization data for the target computing device. The boot component 308 reboots the target computing device from a boot device. Alternatively or in addition, the boot component 308 configures the target computing device to boot from the boot device.

The restoration component 310 interfaces with a backup application 314 to restore the backup of the installed software from the backup computer storage medium to the target computer-readable medium. The restoration component 310 (e.g., via the backup application 314 in an embodiment) accesses the recovery information stored by the state component 306 on the backup computer storage medium. The post-restore component 312 applies the recovery information accessed by the restoration component 310 to the restored software on the target computer-readable medium.

Figure 4:
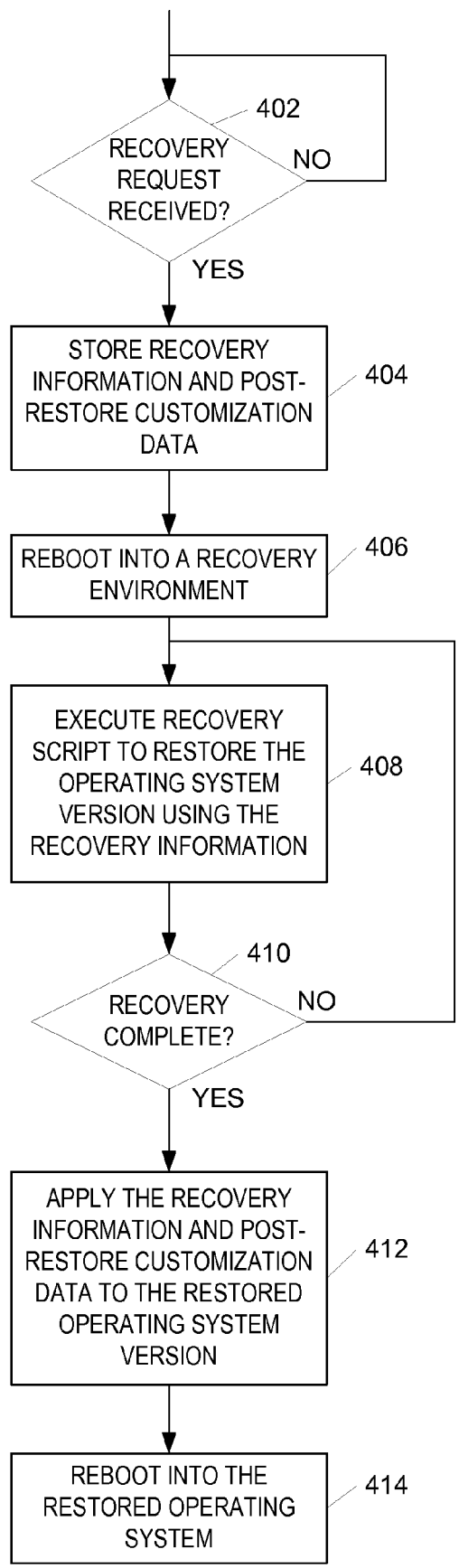
FIG. 4 is an exemplary flow chart illustrating restoration of an operating system version from a backup medium.

The operation of the embodiments in FIG. 2 and FIG. 4 may be implemented by computer-executable instructions organized into the computer-executable components 304, 306, 308, 310, 312 stored on the computer-readable medium 302. Embodiments of the invention include a processor (e.g., such as included in target computing device 102 in FIG. 1) configured to execute the computer-executable instructions. Upon execution, the computer-executable instructions implement aspects of the invention. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Computer readable media (such as computer-readable medium 302), which include both volatile and nonvolatile media, removable and non-removable media, may be any available medium that may be accessed by the service. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computing device. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Referring next to FIG. 4, an exemplary flow chart illustrates restoration of an operating system version (including application programs and the like) from a backup medium. The method illustrated in FIG. 4 waits for receipt of a recovery request at 402. Upon receipt of the recovery request, recovery information associated with the received request and post-restore customization data or other state data are stored on the backup computer storage medium at 404. Some of the recovery information or the post-restore customization data may be generated, if not readily available. The target computing device is rebooted into a recovery environment at 406. A recovery script is executed to restore the requested operating system version from the backup computer storage medium to the target computer-readable medium at 408. The recovery script accesses the recovery information before and/or during the recovery. After completion of the recovery at 410, additional data from the recovery information and the post-restore customization data are applied to the recovered operating system version at 412. The target computing device is rebooted into the recovered operating system at 414.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer or other general purpose computing device executes computer-executable instructions such as those illustrated in the figures and described herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An automated method of restoring an operating system of a target computing device without user intervention, wherein the target computing device has access to a target computer-readable storage medium, said target computer-readable storage medium having a system partition associated therewith, said method comprising:

receiving a request for recovery of an operating system version on the target computing device, said operating system version being stored on a backup computer storage medium;

storing, responsive to the received request, recovery information associated with the received request on the backup computer storage medium, said recovery information comprising post-restore customization data;

setting a value of a boot flag associated with the system partition to indicate that the system partition is inactive;

rebooting the target computing device into a recovery environment;

executing, by the target computing device within the recovery environment, a recovery script to restore the operating system version from the backup computer storage medium to the target computer-readable storage medium, said recovery script accessing the recovery information stored on the backup computer storage medium;

applying the accessed recovery information to the restored operating system version on the target computer-readable storage medium, wherein said applying comprises updating the post-restore customization data on the restored operating system for continuity;

resetting the value of the boot flag associated with the system partition to indicate that the system partition is active; and rebooting the target computing device into the restored operating system.

2. The method of claim 1, wherein rebooting the target computing device into the recovery environment comprises:

accessing a partition table in a master boot record associated with the target computer-readable storage medium, said partition table describing a plurality of partitions including the system partition associated with the target computer-readable storage medium, said partition table having a boot flag associated with each of the plurality of partitions, each boot flag having a value indicating whether the associated partition is active or inactive.

3. The method of claim 1, further comprising:

performing a full backup of the operating system and associated data stored on the target computer-readable storage medium; and storing the full backup on the backup computer storage medium.

4. The method of claim 1, wherein executing the recovery script comprises automatically executing the recovery script stored on the backup computer storage medium responsive to said rebooting the target computing device into the recovery environment.

5. The method of claim 1, wherein rebooting the target computing device into a recovery environment comprises booting the target computing device from a compact disc.

6. The method of claim 1, further comprising modifying a boot script in the recovery environment to trigger execution of the recovery script upon a reboot.

7. One or more computer-readable storage media having computer-executable components stored thereon that, when executed by a processor of a target computing device, restore an operating system of the target computing device without user intervention, wherein the target computing device has access to a target computer-readable storage medium, said target computer-readable storage medium having a system partition associated therewith, said storage media comprising:

an interface component for receiving a request for recovery of a backup of software installed on the target computing device, said backup of the installed software being stored on a backup computer storage medium;

a state component, responsive to the request received by the interface component, for storing recovery information on the backup computer storage medium and setting a value of a boot flag associated with the system partition to indicate that the system partition is inactive, said recovery information being associated with the request and with post-restore customization data for the target computing device;

a boot component for rebooting the target computing device from a boot device;

a restoration component for restoring the backup of the installed software from the backup computer storage medium to the target computer-readable storage medium, said restoration component accessing the recovery information stored by the state component on the backup computer storage medium; and a post-restore component for applying the recovery information accessed by the restoration component to the restored software on the target computer-readable storage medium and resetting the value of the boot flag associated with the system partition to indicate that the system partition is active when the target computing device is rebooted into the restored operating system.

8. The computer-readable storage media of claim 7, wherein the boot component reboots the target computing device from the boot device, said boot device comprising one or more of the following: a flash driver, a compact disc drive, a digital versatile disc drive, a partition on a hard disk, and a network server.

9. The computer-readable storage media of claim 7, wherein the boot component specifies a device boot order for the target computing device, and wherein an entry for a compact disc drive follows an entry for the target computer-readable storage medium in the device boot order.

10. The computer-readable storage media of claim 7, wherein the restoration component accesses a recovery script, said recovery script automatically executing responsive to the rebooting by the boot component to restore the full backup of the installed software.

11. The computer-readable storage media of claim 7, wherein the recovery script is stored on the backup computer storage medium.

12. The computer-readable storage media of claim 7, wherein the backup computer storage medium is external to the target computing device.

13. The computer-readable storage media of claim 7, wherein the backup computer storage medium stores a plurality of versions of backups of the installed software, and wherein the recovery information comprises an identifier corresponding to the requested backup of the installed software.

14. An automated method of restoring an operating system of a target computing device without user intervention, said method comprising:

receiving a request for recovery of an operating system version on a target computing device, said operating system version being stored on a backup computer storage medium;

storing, responsive to the received request, recovery information associated with the received request on the backup computer storage medium, said recovery information comprising post-restore customization data;

accessing a partition table in a master boot record associated with a target computer-readable storage medium, said partition table describing a plurality of partitions including a system partition associated with the target computer-readable storage medium, said partition table having a boot flag associated with each of the plurality of partitions, each boot flag having a value indicating whether the associated partition is active or inactive;

setting the value of the boot flag of the system partition to indicate that the system partition is inactive;

rebooting the target computing device into a recovery environment;

restoring, by a recovery script automatically executed by the target computing device within the recovery environment responsive to said rebooting, the operating system version from the backup computer storage medium to the target computer-readable storage medium, said restoring comprising accessing the recovery information stored on the backup computer storage medium;

applying the accessed recovery information to the restored operating system version on the target computer-readable storage medium, wherein said applying comprises updating the post-restore customization data on the restored operating system for continuity;

resetting the value of the boot flag of the system partition to indicate that the system partition is active; and rebooting the target computing device into the restored operating system.

15. The method of claim 14, further comprising updating a log file with data indicating that the operating system version was restored.

16. The method of claim 14, wherein receiving the request, storing recovery information, accessing the partition table, setting the value of the boot flag, rebooting the target computing device, restoring the operating system version, applying the accessed recovery information, resetting the value of the boot flag, and rebooting the target computing device comprise computer-executable instructions stored on one or more computer-readable storage media.

* * * * *